US006667809B2

(12) United States Patent
Hill

(10) Patent No.: US 6,667,809 B2
(45) Date of Patent: Dec. 23, 2003

(54) SCANNING INTERFEROMETRIC NEAR-FIELD CONFOCAL MICROSCOPY WITH BACKGROUND AMPLITUDE REDUCTION AND COMPENSATION

(75) Inventor: Henry A. Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 138 days.

(21) Appl. No.: 09/917,399

(22) Filed: Jul. 27, 2001

(65) Prior Publication Data
US 2002/0021451 A1 Feb. 21, 2002

Related U.S. Application Data
(60) Provisional application No. 60/221,086, filed on Jul. 27, 2000.

(51) Int. Cl.[7] .............................................. G01B 11/02
(52) U.S. Cl. ....................................... 356/511; 356/516
(58) Field of Search ................................ 356/489, 495, 356/512, 516

(56) References Cited

U.S. PATENT DOCUMENTS

| | | | |
|---|---|---|---|
| 4,659,429 A | 4/1987 | Isaacson et al. | |
| 4,681,451 A | 7/1987 | Guerra et al. | |
| 5,004,307 A | 4/1991 | Kino et al. | |
| 5,105,403 A | 4/1992 | Kando et al. | |
| 5,105,408 A | 4/1992 | Lee et al. | |
| 5,121,256 A | 6/1992 | Corle et al. | |
| 5,125,750 A | 6/1992 | Corle et al. | |
| 5,150,338 A | 9/1992 | Birecki et al. | |
| 5,214,630 A | 5/1993 | Goto et al. | |
| 5,349,443 A | 9/1994 | Guerra | |
| 5,371,588 A | 12/1994 | Davis et al. | |
| 5,442,443 A | 8/1995 | Guerra | |
| 5,497,359 A | 3/1996 | Mamin et al. | |
| 5,602,643 A * | 2/1997 | Barrett | 356/495 |
| 5,602,819 A | 2/1997 | Inagaki et al. | |
| 5,602,820 A | 2/1997 | Wickramasinghe et al. | |
| 5,666,197 A | 9/1997 | Guerra | |
| 5,689,480 A | 11/1997 | Kino | |
| 5,737,084 A * | 4/1998 | Ishihara | 356/609 |
| 5,739,527 A | 4/1998 | Hecht et al. | |
| 5,760,901 A | 6/1998 | Hill | |
| 5,789,734 A | 8/1998 | Torigoe et al. | |
| 5,834,767 A | 11/1998 | Hasegawa et al. | |
| 5,883,872 A | 3/1999 | Kino | |
| 5,915,048 A | 6/1999 | Hill et al. | |
| 6,091,496 A | 7/2000 | Hill | |
| 6,249,352 B1 * | 6/2001 | Davies et al. | 356/512 |
| 2002/0033952 A1 * | 3/2002 | Hill | 356/512 |
| 2002/0033953 A1 * | 3/2002 | Hill | 356/516 |

FOREIGN PATENT DOCUMENTS

| | | |
|---|---|---|
| EP | 0 409 468 A2 | 1/1991 |
| EP | 0 757 271 A2 | 2/1997 |
| JP | 5-73980 | 5/1993 |
| JP | 5-174410 | 5/1993 |
| WO | WO99/63300 | 12/1999 |

OTHER PUBLICATIONS

Bauer et al., "Magnetic Domain Imaging with a Scanning Near–Field Optical Microscope Using a Modified Sagnac Interferometer," *Journal of Microscopy*, 194:2/3:507–511, May/Jun. 1999.

(List continued on next page.)

Primary Examiner—Robert H. Kim
Assistant Examiner—Thomas R Artman
(74) Attorney, Agent, or Firm—Fish & Richardson P.C.

(57) ABSTRACT

The invention features systems and methods for near-field, interferometric microscopy in which one or more phase retardation plates are positioned in the measurement and/or reference arms to reduce the contribution to the interference signal of background sources including, e.g., a beam component scattered from a near-field aperture used to couple a probe beam to a sample. The systems may operate in either reflective or transmissive modes.

28 Claims, 5 Drawing Sheets

OTHER PUBLICATIONS

Courjon et al., "New Optical Near Field Developments: Some Perspectives in Interferometry," *Ultramicroscopy*, 61:117–125, 1995.

Pilevar et al., "Reflection Near–field Scanning Optical Microscopy: an Interferometric Approach," *Ultramicrosopy*, 61:233–236, 1995.

Pohl et al., "Near–field Optics: Light for the World of NANO," *J. Vac. Sci. Technol. B*, 12:3:1441–1446, May/Jun. 1994.

Vaez–Iravani et al., "Phase Contrast and Amplitude Pseudoheterodyne Interference Near Field Scanning Optical Microscopy," *Appl. Phys. Lett.* 62:10:1044–1046, Mar. 8, 1993.

Fischer, "Optical Characteristics of 0.1 $\mu$m Circular Apertures in a Metal Film as Light Sources for Scanning Ultramicroscopy," *J. Vac. Sci Technol. B* 3:1:386–390, Jan./Feb. 1985.

Fischer et al., "Near–Field Optical ScanningMicroscopy and Enhanced Spectroscopy with Submicron Apertures," *Scanning Microscopy Supplement*, 1:47–52, 1987.

Durig et al., "Near–Field Optical–Scanning Microscopy," *J. Appl. Phys.* 59:10:3318–3327, May 15, 1986.

Meixner et. al., "Direct Measurement of Standing Evanescent Waves with a Photon–Scanning Tunneling Microscope," *Applied Optics*, 33:34:7995–8000, Dec. 1, 1994.

Bainier et al., "Evanescent Interferometry by Scanning Optical Tunneling Detection," *J.Opt.Soc.Am.A*, 13:2:267–275, Feb. 1996.

Guerra, "Photon Tunneling Microscopy," *Applied Optics*, 29:26:3741–3752, Sep. 10, 1990.

* cited by examiner

SCANNING INTERFEROMETRIC NEAR-FIELD CONFOCAL MICROSCOPY WITH BACKGROUND AMPLITUDE REDUCTION AND COMPENSATION

CROSS-REFERENCE TO RELATED APPLICATIONS

This application claims priority from provisional application Ser. No. 60/221,086 filed Jul. 27, 2000 by Henry A. Hill entitled "Scanning Interferometric Near-Field Confocal Microscopy with Background Amplitude Reduction and Compensation," the contents of which is incorporated herein by reference.

BACKGROUND

Scanning microscopy techniques, including near-field and confocal scanning microscopy, conventionally employ a single spatially localized detection or excitation element, sometimes known as the scanning probe ["Near-field Optics: Theory, Instrumentation, and Applications," M. A. Paesler and P. J. Moyer, (Wiley-New York) (1996); "Confocal Laser Scanning Microscopy," C. Sheppard, *BIOS* (Scientific-Oxford and Springer-New York) (1997).] The near-field scanning probe is typically a sub-wavelength aperture positioned in close proximity to a sample; in this way, sub-wavelength spatial resolution in the object-plane is obtained. An aperture smaller than a free space optical wavelength of an optical beam used in a near-field microscopy application is hereinafter referred to as a sub-wavelength aperture. The confocal scanning probe employs diffraction-limited optics to achieve resolution of the order of the optical wavelength. Spatially extended images are acquired by driving the scanning probe in a raster pattern.

Effects of background beams in certain near-field microscopy systems generally are a significant source of systematic and statistical errors.

SUMMARY OF THE INVENTION

The invention features systems and methods for near-field, interferometric microscopy in which one or more phase retardation plates are positioned in the measurement and/or reference arms to reduce the contribution to the interference signal of background sources including, e.g., a beam component scattered from a near-field aperture used to couple a probe beam to a sample. The systems may operate in either reflective or transmissive modes. Furthermore, the microscopy systems using the aperture may be designed to investigate the profile of a sample, to read optical date from a sample, and/or write optical date to a sample.

In general, in one aspect, the invention features an interferometric optical microscopy system for imaging an object. The system includes: (i) a beam splitter positioned to separate an input beam into a measurement beam and a reference beam; (ii) a measurement beam source array positioned to receive the measurement beam, the measurement beam source array including a mask having an array of measurement apertures each configured to radiate a portion of the measurement beam to the object, the object interacting with the radiated measurement beam portions to direct signal radiation back through the apertures to define a measurement return beam; (iii) a reference beam source array positioned to receive the reference beam, the reference beam source array including an array of elements each configured to radiate a portion of the reference beam, the radiated reference beam portions defining a reference return beam; (iv) a multi-element photo-detector; (v) imaging optics positioned to direct the measurement and reference return beams to the photo-detector and configured to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object; and (vi) at least one phase mask positioned to contact the return measurement beam and the return reference beam, wherein the at least one phase mask causes the conjugate image for each reference element and each measurement aperture to have an asymmetric profile along at least a first dimension.

Embodiments of the microscopy system may include any of the following features.

The at least one phase mask may include a first phase mask and a second phase mask, wherein the first phase mask is positioned to contact the return measurement beam and not the return reference beam, and wherein the second phase mask is positioned to contact the return reference beam and not the return measurement beam. For example, the first phase mask may be positioned in a pupil plane of the imaging optics for the return measurement beam and the second phase mask may be positioned in a pupil plane of the imaging optics for the return reference beam.

Alternatively, the at least one phase mask may include a first phase mask positioned to contact both of the return measurement beam and the return reference beam. For example, that first phase mask is positioned in a pupil plane of the imaging optics for both the return measurement beam and the return reference beam.

The at least one phase mask may divide the transverse profile of the return measurement beam and the return reference beam into multiple sections along the first dimension and imparts a relative phase shift equal to $\pi+2\pi n$, where is n is an integer, to half of the multiple sections.

The phase mask may further cause the conjugate image for each reference element and each measurement aperture to have an asymmetric profile along a second dimension orthogonal to the first dimension. For example, the at least one phase mask may divide the transverse profile of the return measurement beam and the return reference beam along the first dimension into multiple sections and impart a relative phase shift equal to $\pi+2\pi n_1$, where is $n_1$ is an integer, to half of the multiple sections corresponding to the first dimension, and the at least one phase mask may further divide the transverse profile of the return measurement beam and the return reference beam along a second dimension orthogonal to the first dimension into multiple sections and impart a relative phase shift equal to $\pi+2\pi n_2$, where is $n_2$ is an integer, to half of the multiple sections corresponding to the second dimension.

The system may further include a second, at least one phase mask positioned to contact the return measurement beam and the return reference beams, wherein the second, at least one phase mask causes the conjugate image for each reference element and each measurement aperture to have an asymmetric profile along a second dimension orthogonal to the first dimension.

The system may further include a pinhole array positioned adjacent the photodetector, wherein each pinhole is aligned with a separate set of one or more detector elements, and wherein the imaging system causes the conjugate image for each measurement aperture to align with a corresponding pinhole of the pinhole array.

The mask in the measurement beam source array may further include an array of measurement scattering elements, wherein each measurement scattering element is adjacent a corresponding one of the measurement apertures and has transverse dimensions comparable to the corresponding measurement aperture. Each measurement scattering element scatters a portion of the measurement beam, and the measurement return beam further includes the portions of the measurement beam scattered by the measurement scattering elements. In such cases, the imaging optics are further configured to produce a conjugate image of the array of measurement scattering elements that overlaps with the conjugate image of the array of reference elements, wherein the conjugate image for each measurement scattering element overlaps with the conjugate image of a corresponding reference element to produce an optical interference signal that provides an estimate of scattering from the adjacent measurement aperture.

For embodiments including the scattering elements, the system may further include a pinhole array positioned adjacent the photo-detector, wherein each pinhole is aligned with a separate set of one or more detector elements, and wherein the imaging system causes the conjugate image for each measurement aperture and each measurement scattering element to align with a corresponding pinhole of the pinhole array.

Each reference element may include a reflective element.

Each reference element may include a transmissive aperture.

In general, in another aspect, the invention features an interferometric optical microscopy system for imaging an object, the system including: (i) a beam splitter positioned to separate an input beam into a measurement beam and a reference beam; (ii) a measurement beam source array positioned to receive the measurement beam, the measurement beam source array including a mask having an array of source apertures each configured to radiate a portion of the measurement beam to the object; (iii) a measurement beam detector array including a mask having an array of measurement apertures, wherein the object interacts with the radiated measurement beam portions and directs the resulting signal radiation through the measurement apertures to define a measurement return beam; (iv) a reference beam source array positioned to receive the reference beam, the reference beam source array including an array of elements each configured to radiate a portion of the reference beam, the radiated reference beam portions defining a reference return beam; (v) a multi-element photo-detector; (vi) imaging optics positioned to direct the measurement and reference return beams to the photo-detector and configured to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object; and (vii) at least one phase mask positioned to contact the return measurement beam and the return reference beams, wherein the at least one phase mask causes the conjugate image for each reference element and each measurement aperture to have an asymmetric profile along at least a first dimension.

Embodiments of the microscopy system may include any of the following features.

The at least one phase mask may include a first phase mask and a second phase mask, wherein the first phase mask is positioned to contact the return measurement beam and not the return reference beam, and wherein the second phase mask is positioned to contact the return reference beam and not the return measurement beam. For example, the first phase mask may be positioned in a pupil plane of the imaging optics for the return measurement beam and the second phase mask may be positioned in a pupil plane of the imaging optics for the return reference beam.

Alternatively, the at least one phase mask may include a first phase mask positioned to contact both of the return measurement beam and the return reference beam. For example, that first phase mask is positioned in a pupil plane of the imaging optics for both the return measurement beam and the return reference beam.

The at least one phase mask may divide the transverse profile of the return measurement beam and the return reference beam into multiple sections along the first dimension and imparts a relative phase shift equal to $\pi+2\pi n$, where is n is an integer, to half of the multiple sections.

The phase mask may further cause the conjugate image for each reference element and each measurement aperture to have an asymmetric profile along a second dimension orthogonal to the first dimension. For example, the at least one phase mask may divide the transverse profile of the return measurement beam and the return reference beam along the first dimension into multiple sections and impart a relative phase shift equal to $\pi+2\pi n_1$, where is $n_1$ is an integer, to half of the multiple sections corresponding to the first dimension, and the at least one phase mask may further divide the transverse profile of the return measurement beam and the return reference beam along a second dimension orthogonal to the first dimension into multiple sections and impart a relative phase shift equal to $\pi+2\pi n_2$, where is $n_2$ is an integer, to half of the multiple sections corresponding to the second dimension.

The system may further include a second, at least one phase mask positioned to contact the return measurement beam and the return reference beams, wherein the second, at least one phase mask causes the conjugate image for each reference element and each measurement aperture to have an asymmetric profile along a second dimension orthogonal to the first dimension.

The system may further include a pinhole array positioned adjacent the photodetector, wherein each pinhole is aligned with a separate set of one or more detector elements, and wherein the imaging system causes the conjugate image for each measurement aperture to align with a corresponding pinhole of the pinhole array.

Each reference element may include a reflective element.

Each reference element may include a transmissive aperture.

In general, in another aspect, the invention features an interferometric, microscopy method for imaging an object, the method including: (i) separating an input beam into a measurement beam and a reference beam; (ii) directing the measurement beam to an array of measurement apertures to cause a portion of the measurement beam to couple through each of the measurement apertures and radiate the object; (iii) receiving signal radiation from the object back through the apertures in response to the radiated measurement beam portions, wherein the signal radiation defines a measurement return beam; (iv) directing the reference beam to array of reference elements to cause each configured to radiate a portion of the reference beam, the radiated reference beam portions defining a reference return beam; (v) imaging the measurement and reference return beams onto a photodetector to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object; and (vi) imparting a phase pattern onto each of the return measurement beam and the return reference beams that causes the conjugate image for each reference element and each measurement aperture to have an asymmetric profile along at least a first dimension.

In general, in another aspect, the invention features an interferometric, microscopy method for imaging an object, the method including: (i) separating an input beam into a measurement beam and a reference beam; (ii) directing the measurement beam to an array of source apertures to cause a portion of the measurement beam to couple through each of the measurement apertures and radiate the object; (iii) receiving signal radiation from the object through an array of measurement apertures in response to the radiated measurement beam portions, wherein the signal radiation defines a measurement return beam; (iv) directing the reference beam to array of reference elements to cause each configured to radiate a portion of the reference beam, the radiated reference beam portions defining a reference return beam; (v) imaging the measurement and reference return beams onto a photo-detector to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object; and (vi) imparting a phase pattern onto each of the return measurement beam and the return reference beams that causes the conjugate image for each reference element and each measurement aperture to have an asymmetric profile along at least a first dimension.

Embodiments of either of the above methods may further include features corresponding to any of the features described above in connection with the microscopy systems.

Confocal and near-field confocal, microscopy systems are also described in the following, commonly-owed provisional applications: Ser. No. 09/631,230 filed Aug. 2, 2000 by Henry A. Hill entitled "Scanning Interferometric Near-Field Confocal Microscopy," and the corresponding PCT Publication WO 01/09662 A2 published Feb. 8, 2001; Provisional Application Serial No. 60/221,019 filed Jul. 27, 2000 by Henry A. Hill and Kyle B. Ferrio entitled "Multiple-Source Arrays For Confocal And Near-Field Microscopy" and the corresponding Utility application Ser. No. 09/917, 402 having the same title filed on Jul. 27, 2001; Provisional Application Serial No. 60/221,086 filed Jul. 27, 2000 by Henry A. Hill entitled "Control of Position and Orientation of Sub-Wavelength Aperture Array in Near-Field Microscopy" and the corresponding Utility application Ser. No. 09/917,401 having the same title filed on Jul. 27, 2001; Provisional Application Serial No. 60/221,091 filed Jul. 27, 2000 by Henry A. Hill entitled "Multiple-Source Arrays with Optical Transmission Enhanced by Resonant Cavities and the corresponding Utility application Ser. No. 09/917, 400 having the same title filed on Jul. 27, 2001; and Provisional Application Serial No. 60/221,295 by Henry A. Hill filed Jul. 27, 2000 entitled "Differential Interferometric Confocal Near-Field Microscopy" and the corresponding Utility application Ser. No. 09/917,276 having the same title filed on Jul. 27, 2001; the contents of each of the preceding applications being incorporated herein by reference. Aspects and features disclosed in the preceding provisional applications may be incorporated into the embodiments described in the present application.

Embodiments of the invention may include any of the following advantages.

One advantage is a tomographic complex amplitude imaging technique that conveniently reduces or eliminates the statistical error effects of light from out-of-focus image points.

Another advantage is an improved technique for tomographic complex amplitude imaging wherein systematic error effects of out-of-focus light images are greatly reduced or eliminated.

Another advantage is a tomographic complex amplitude imaging technique which allows substantially simultaneous imaging of an object at multiple image points.

Another advantage is a convenient technique for tomographic complex amplitude imaging in with the means to obtain a signal-to-noise ratio for the images that is achievable with an interferometric system.

Another advantage is a tomographic complex amplitude imaging system and technique which avoids the computation difficulties of solving nonlinear differential equations.

Another advantage is an interferometric profiler based on interferometry of near-field beams.

Another advantage is an interferometric profiler based on interferometric confocal microscopy of near-field beams.

Another advantage is a scanning interferometric near-field confocal microscope operating in a continuous scan mode with a pulsed input optical beam.

Another advantage is a scanning interferometric near-field confocal microscope with enhanced signal-to-noise ratios for measured complex amplitudes of scattered/reflected near-field beams by an object material.

Another advantage is a simpler inversion type of calculation for properties of object being profiled and/or imaged.

Another advantage is that the directions of propagation of components of a near-field probe beam at a given volume section of an object being profiled/imaged are substantially the same for a given measured amplitude and phase of a reflected/scattered near-field probe beam from the volume section wherein the dimensions of the volume section are much less than the dimensions of the source of the near-field probe beam.

Another advantage is that amplitudes and phases of reflected/scattered near-field probe beams by an object being profiled/imaged are measured for substantially low order electric and magnetic multipole near-field sources wherein the dominant multipole sources are three different near-field probe beam sources comprising an electric dipole and two different orthogonal orientations of a magnetic dipole.

Another advantage is that effects of an interference term between a back-ground beam produced by scattering and/or reflections of an antecedent beam of a beam generating a near-field probe beam and a reflected/scattered portion of the near-field probe beam by an object being profiled/imaged are compensated.

Another advantage is that effects of an interference term between a back-ground beam produced by scattering and/or reflections of an antecedent beam of a beam generating a near-field probe beam and a reference beam are compensated.

Another advantage is that statistical errors in measured amplitudes and phases of reflected/scattered near-field probe beams by an object being profiled/imaged can be substantially the same as statistical errors based on Poisson statistics of the reflected/scattered near-field probe beams, i.e. not significantly degraded by the presence of background signals.

Another advantage is that a wavelength dependence of amplitudes and phases of reflected/scattered near-field probe beams for near-field probe beams generated by different near-field probe beam sources substantially comprising an electric dipole and two different orthogonal orientations of a magnetic dipole is measured.

Another advantage is that a radial dependence of amplitudes and phases of reflected/scattered near-field probe beams for near-field probe beams generated by different near-field probe beam sources substantially comprising an electric dipole and two different orthogonal orientations of a magnetic dipole is measured.

Another advantage is that an angular dependence of amplitudes and phases of reflected/scattered near-field probe beams for near-field probe beams generated by different near-field probe beam sources substantially comprising an electric dipole and two different orthogonal orientations of a magnetic dipole is measured.

Another advantage is that a resolution of the invention is only weakly dependent on optical resolution of an optical system imaging spatially filtered reflected/scattered near-field probe beams from an object being profiled/imaged onto pixels of a detector wherein the spatially filtering is achieved by an array of wavelength and/or sub-wavelength apertures.

Another advantage is that a source of a near-field probe beam may be a pulsed source.

Another advantage is that scanning of an object being profiled/imaged may be implemented in a "step and repeat" mode or in a continuous scan mode.

Another advantage is that measured interference terms between spatially filtered reflected/scattered near-field probe beams and reference beams can be obtained substantially simultaneously for a one-dimensional or a two-dimensional array of locations on an object being profiled/imaged.

Another advantage is that a rotation in a plane of polarization of a reflected/scattered near-field probe beam by an object being profiled/imaged due to a given state of magnetization of the object at a point in or on the object is measured.

Another advantage is that statistical errors in the measured values of intensity for each point in an one-dimensional or two-dimensional arrays of measured intensity values are the same as the statistical error acquired in a measured intensity value for a single pinhole interferometric confocal near-field microscope.

Another advantage is that a rotation in a state of polarization of a reflected/scattered near-field probe beam by an object being profiled/imaged, due for example to a state of magnetization or a changes in a state of magnetization of the object at a point in or on the object is measured.

Another advantage is that the invention may be used to write to an optical data storage medium such as a magneto-optical material.

Another advantage is that the invention profiles a surface and internal layers near the surface of an object being profiled/imaged without contacting the object.

Another advantage is that a wavelength of a source of a near-field probe beam may be in the ultraviolet, visible, or the infrared. For example, the source may comprise two or more different wavelengths.

Another advantage is that either optical heterodyne or homodyne techniques may be used to measure amplitudes and phases of interference terms between a reference beam and a reflected/scattered near-field probe beam from an object being profiled/imaged.

Another advantage is that an effective spatial resolution of the invention may be improved over the resolution obtained with non-interferometric near-field microscopy by the combination of information obtained from measured amplitudes and phases of reflected/scattered near-field probe beams for different types of near-field probe beam sources, i.e. substantially an electric dipole and two different orientations of a magnetic dipole.

Another advantage is that a complex value of an index of refraction for an object being profiled/imaged can be determined from measured arrays of amplitudes and phases of reflected/scattered near-field probe beams produced by reflection/scattering by the object, wherein the dimensionality of the arrays may comprise one or two dimensions corresponding to one and two dimensions of space, a dimension for the spatial separation of the source of the near-field probe beam and the object, a dimension for each of wavelength of components of the near-field probe beam source, and a dimension for the multipole characterization of the source of the near-field probe beam.

Another advantage is that multiple layers of optical data stored on and/or in an optical storage medium can be read substantially simultaneously.

Another advantage is that a source of near-field probe beams can be sub-wavelength apertures in a sub-wavelength thick conducting layer.

Another advantage is that a source of a near-field probe beam(s) may comprise wavelength and sub-wavelength Fresnel zone plate(s).

Another advantage is that microlenses may be added to a source(s) of near-field probe beam(s) to alter properties of the near-field probe beam(s) at an object being profiled/imaged.

Another advantage is that gratings may be added to an array of wavelength or sub-wavelength apertures operating as spatial filters of reflected/scattered or transmitted near-field probe beam(s) to alter properties of the reflected/scattered or transmitted near-field probe beam(s).

Another advantage is that an optical system imaging onto pixels of a detector spatially filtered reflected/scattered near-field probe beam from an object being profiled/imaged has a depth resolution of a pinhole confocal microscope.

Another advantage is that microlenses may be added to a source(s) of near-field probe beam(s) to alter properties of the near-field probe beam(s) at an object being profiled/imaged.

Another advantage is that gratings may be added to a source(s) of near-field probe beam(s) to alter properties of the near-field probe beam(s) at an object being profiled/imaged.

Another advantage is that gratings may be added to an array of wavelength/sub-wavelength apertures operating as spatial filters of reflected/scattered or transmitted near-field probe beam(s) to alter properties of the reflected/scattered or transmitted near-field probe beam(s).

Another advantage is that a change in temperature of a site in or on an object being profiled/imaged can be detected as a change in the complex value of the index of refraction of the object at the site.

Another advantage is that an angular distribution of a reflected/scattered near-field probe beam from an object being profiled/imaged is measured to obtain information about a multipole nature of the reflected/scattered near-field probe beam.

Another advantage is that an angular distribution of a reflected/scattered near-field probe beam from a wavelength or sub-wavelength size structure in/or on an object being imaged or profiled is measured.

Another advantage is that if it is necessary to correct for out-of-focus images which are already greatly reduced in the apparatus, the computer processing required to achieve a given level of correction with the apparatus is significantly reduced compared to the computer processing required in prior art scanning single-pinhole and scanning slit confocal and scanning single-pinhole and scanning slit confocal interferometric microscopy.

Other features, aspects, and advantages follow.

BRIEF DESCRIPTION OF THE DRAWINGS

In the drawings, wherein like reference characters denote similar elements throughout the several views.

DETAILED DESCRIPTION OF THE INVENTION

Figure 1:
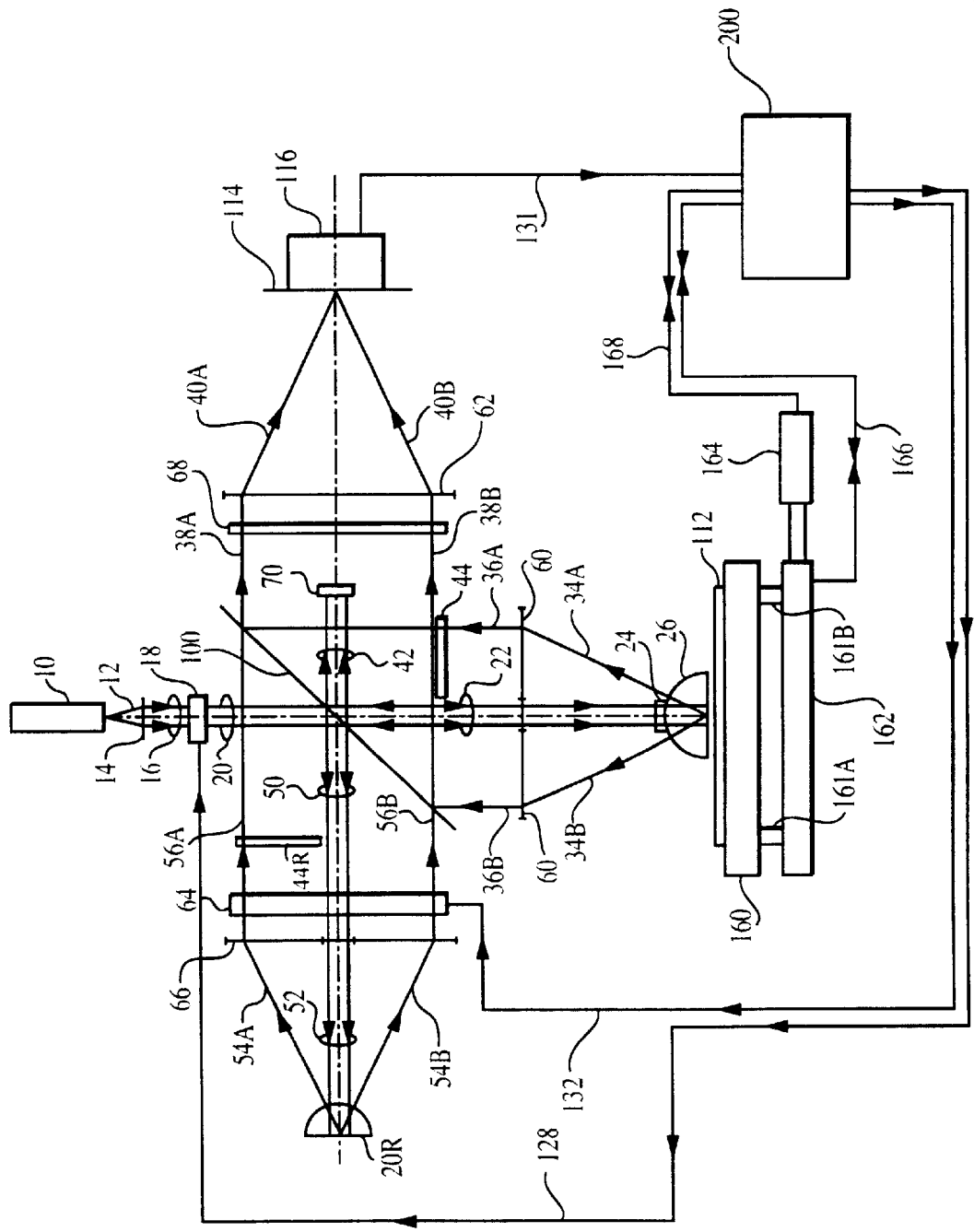
FIG. 1 illustrates, in schematic form, the first embodiment of the present invention.

Embodiments of the present invention comprise scanning interferometric near-field confocal microscopes operating in either a reflection or transmission mode with a reduction of effects of background beams and a corresponding reduction in statistical errors. The embodiments further comprise transmission of an optical beam through one or more wavelength and sub-wavelength apertures, e.g., arrays of wavelength and sub-wavelength apertures, which employs apertures smaller than a free space optical wavelength of an optical beam used in the near-field microscopy. The sub-wavelength apertures are hereinafter referred to as sub-wavelength apertures.

Embodiments of the present invention can permit the separation of the complex amplitude of reflected and/or scattered light by a wavelength or sub-wavelength scattering site or aperture in a line section or a plane section from the complex amplitude of background light produced by superimposed out-of-focus images of structures before and to the side of the wavelength or sub-wavelength scattering site or aperture under examination. The wavelength or sub-wavelength scattering site or aperture under examination are located in either a line section or a two-dimensional section. The described tomographic technique can separate a desired complex amplitude signal of an line section or a plane section from "background" complex amplitude signals generated by various mechanisms. Such background complex amplitude signals may be (1) out-of-focus images of sections of apparatus of an interferometric near-field confocal microscope other than the line section or two-dimensional section being imaged, (2) scattering of a desired amplitude signal, (3) scattering of signals originating from sources other than the line section or two-dimensional section being imaged, and/or (4) thermal radiation. Scattering sites and thermal radiation sources may be located in the space before and to the side of the line section or two-dimensional section under examination.

The technique for separation of background beams is implemented with either of two different levels of discrimination against out-of-focus images. In the first level (Level 1), the impulse response functions of imaging subsystems of the apparatus of the present invention are manipulated in either of two orthogonal planes by introducing one-dimensional patterns of phase changes, respectively, at pupils of the respective imaging subsystems. In the second level (Level 2), the impulse response functions of imaging subsections of the apparatus of the present invention are manipulated in both of two orthogonal planes by introducing two-dimensional patterns of phase changes at pupils of the respective imaging subsystems. A Level 2 discrimination leads to a more effective discrimination of out-of-focus images from in-focus images, with respect to both systematic and statistical errors, than a Level 1 discrimination. Level 1 and Level 2 discriminations may be implemented for any of the embodiments that are described.

In the description that follows, embodiments are described with a Level 1 discrimination. Further embodiments of the invention can include Level 2 discrimination, which follow in a straightforward manner from the embodiments that follow. The Level 1 discrimination is based on a particular orientation of an orthogonal plane in which the impulse response functions of imaging subsystems are manipulated. The choice of the orientation of the orthogonal plane in which the impulse response functions of imaging subsystems are manipulated impacts on the degree of reduction of the effects of background beams on statistical errors achieved in apparatus of the present invention.

While the apparatus of the present invention has application for a wide range of radiation sources, the following description is taken, by way of example, with respect to an optical measuring system in which the incident beam is a beam of electromagnetic radiation, e.g., an optical beam. In further embodiments, for example, the beam incident on the aperture or arrays of apertures can include an acoustic radiation beam, an electron beam, and an atomic beam.

The source of optical beams used by embodiments of the present invention include CW and pulsed sources in different combinations with single and multiple wavelength sources.

Also, while the apparatus of the present invention has application for a wide range of imaging systems, the following description is taken, by way of example, with respect to interferometric confocal near-field microscopy measuring systems. Optical cavities as used herein includes, but is not limited to, use in scanning and step-and-repeat interferometric near-field confocal microscopy systems and scanning and step-and-repeat confocal and interferometric confocal microscopy systems.

Referring to the drawings in detail, FIG. 1 depicts in schematic form the first embodiment of the present invention. As shown in FIG. 1, the first embodiment comprises an interferometer, a source 10, object material 112, object material chuck 160, chuck stage 162, translator 164, reference object 20R, and detector 116. The configuration of the interferometer is known in the art as a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni (VDI Berichte NR. 749, pp. 93–106, 1989) may be incorporated into the apparatus of FIG. 1 without departing from the spirit and scope of the present invention.

For the first embodiment, light source 10 is preferably a point source or a source of radiation spatially incoherent across the surface of the source, preferably a laser or like source of coherent or partially coherent radiation, and preferably linearly polarized. Light source 10 emits input beam 12. As shown in FIG. 1, input beam 12 enters collimating lens 14 to form input beam 16. Input beam 16 is transmitted by a phase retardation plate 18 as input beam 20. The plane of polarization of input beam 20 is rotated by phase retardation plate 18 to be either parallel or orthogonal to the plane of FIG. 1. However, other orientations of the plane of polarization of input beam 20 may be beneficially used in certain end use applications. The function of phase retardation plate 18 is controlled by signal 128 from electronic controller, signal processor, and computer 200.

Input beam 20 is incident on a non-polarizing beam splitter 100 and a first portion thereof is transmitted as a measurement beam 22. A second portion of input beam 20 incident on beam splitter 100 is reflected as reference beam 50. Measurement beam 22 is transmitted through an aperture in lens 60 and incident on a lens assembly comprising lenses 24 and 26.

Figure 2A:
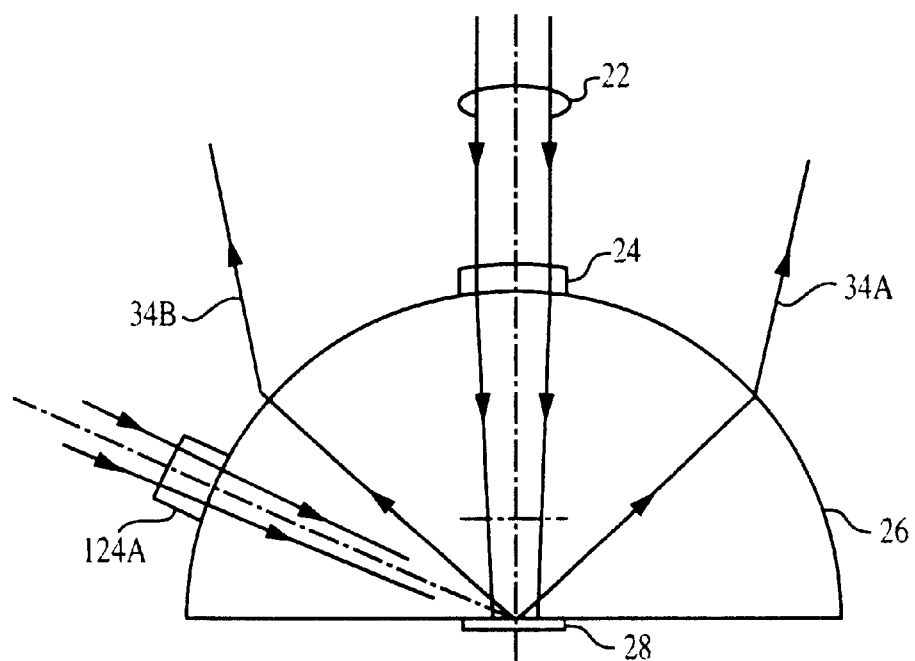
FIG. 2a illustrates, in schematic form, the lens assembly comprising Amici type objective lens 26 and lens 24, as used in the first embodiment, and the lens assembly comprising Amici type objective lens 26 and lens 124, as used in the second embodiment.

The propagation of measurement beam 22 through the lens assembly is shown schematically in an expanded form in FIG. 2a. Lens 26 is an Amici type objective lens. Measurement beam 22 is focused by the lens assembly to a beam diameter at element 28 that encompasses an array of at least one sub-wavelength aperture and at least one sub-wavelength scattering site in element 28. Element 28 shown schematically in FIG. 2b in an expanded form is a conducting layer on a surface of Amici type objective lens 26.

Figure 2B:
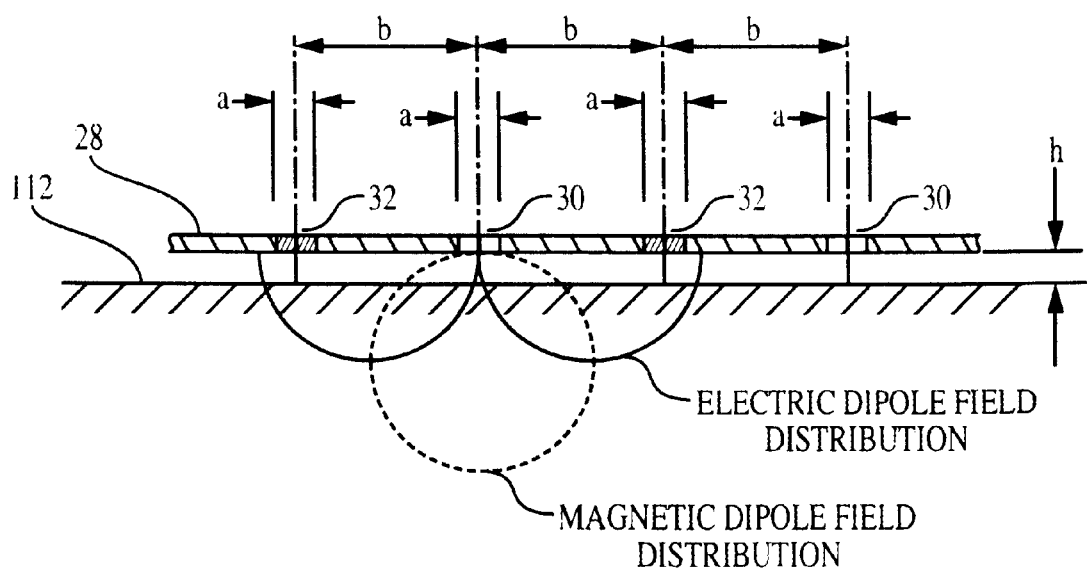
FIG. 2b illustrates, in schematic form, conducting element 28 in relation to object material 112 being profiled/imaged and angular distribution functions of electric far field components associated with an electric dipole and a magnetic dipole located at a sub-wavelength aperture 30.

The sub-wavelength apertures and the sub-wavelength scattering sites are elements 30 and 32, respectively, as indicated in FIG. 2b. Sub-wavelength scattering sites 32 are preferably non-transmitting conducting elements with a complex index of refraction different from the complex index of refraction of the conducting material of element 28. The complex indices of refraction are different so that elements 32 effectively serve as sub-wavelength scattering sites. The diameter of elements 30 and 32 is a with $a<\lambda$, preferably $a<<\lambda$, where $\lambda$ is the wavelength of measurement beam 22. The separation of elements 30 and 32 is b with $b>a$, preferably $b>>a$. The thickness of conducting material of element 28 is of the order of 20 nm and chosen so that the fraction of the probe beam transmitted by sections of element 28 not containing sub-wavelengths 30 is <<1.

The relative spacing of elements 30 in element 28 is further selected to minimize the effect of one sub-wavelength aperture on the transmission properties a second sub-wavelength aperture. A coupling leading to either an enhancement or a reduction of transmission by an array of sub-wavelength apertures will complicate interpretation of results obtained with the apparatus of the first embodiment.

The diameters of sub-wavelength apertures 30 need not be restricted to a single diameter as shown schematically in FIG. 2b but may beneficially comprise two or more diameters for an end use application. Further, the shapes of sub-wavelength apertures 30 may comprise shapes other than circular, e.g., squares or rectangles without departing from the spirit and scope of the present invention.

The spacing of sub-wavelength apertures 30 need not be restricted to a single value as shown schematically in FIG. 2b but may beneficially comprise two or more different spacings for an end-use application without departing from the spirit and scope of the present invention.

Further, the arrangement of sub-wavelength apertures 30 may be arranged in various geometric patterns or a random pattern without departing from the spirit and scope of the present invention.

The apertures 30 in element 28 can be formed as holes in a mask or as transmissive dielectric regions in an otherwise non-transmissive mask, e.g., transmissive vias in an otherwise reflective element. Moreover, the dielectric material in element 28 defining the apertures 30 can form a waveguide or optical cavity that enhances the transmission of the near-field probe beam to the sample. See, e.g., the previously cited application "Multiple-Source Arrays For Confocal And Near-Field Microscopy." Furthermore, in the presently described embodiment, the mask portion of element 28 is described as conducting to indicate that it is reflective. In other embodiments, element 28 is not necessarily conductive, but is, generally, not transmissive, with the coupling of the near-field probe beams to the sample being accomplished by the apertures 30 in element 28.

The sub-wavelength apertures may further comprise a Fresnel zone plate or a microlens to alter beneficially in certain end use applications the transmission through an array of sub-wavelength apertures without departing from the spirit and scope of the present invention. In certain other end use applications, gratings may be added to an array of wavelength/sub-wavelength apertures operating as spatial filters of reflected/scattered or transmitted near-field probe beam(s) to alter properties of the reflected/scattered or transmitted near-field probe beam(s) without departing from the spirit and scope of the present invention.

A first portion of the measurement beam incident on sub-wavelength apertures 30 is transmitted as a near-field probe beam. A portion of the near-field probe beam is incident on object material 112 and a portion thereof is reflected and/or scattered back to the sub-wavelength apertures 30, and a portion thereof is transmitted as a near-field return probe beam. The spatial separation of adjacent surfaces of object material 112 and conducting element 28 is h as indicated in FIG. 2b. The value of h is preferably of the order of 2a. A second portion of the measurement beam incident on sub-wavelength apertures 30 is reflected and/or scattered as a first background return beam. A portion of the measurement beam incident on sub-wavelength scattering sites 32 is reflected and/or scattered as a second background return beam. The near-field return probe beam, the first background return beam, and the second background return beam exit Amici type objective lens 26 as return beam 34 shown as rays 34A and 34B in FIGS. 1a and 4a wherein return beam 34 comprises rays between rays 34A and 34B. Return beam 34 is collimated by lens 60 as return beam 36 shown as rays 36A and 36B in FIG. 1, wherein beam 36 comprise rays between rays 36A and 36B.

A portion of the measurement beam not incident on sub-wavelength apertures 30 and scattering sites 32 is reflected as a return measurement beam. The return measurement beam exits lens 24 as a beam substantially parallel to measurement beam 22 and a portion thereof is reflected as a return measurement beam component of beam 42. Beam 42 is incident on and substantially occulted by stop 70.

Reference beam 50 is transmitted by a phase shifter 64, transmitted by an aperture in lens 66, incident on reference object 20R, and reflected as reflected reference beam 54 shown as rays 54A and 54B in FIG. 1 wherein beam 54 comprises rays between rays 54A and 54B. Beam 54 is collimated by lens 66 and transmitted by phase shifter 64 as a reflected reference beam 56 shown as rays 56A and 56B in FIG. 1, wherein beam 56 comprises rays in between rays 56A and 56B. Phase shifter 64 introduces a relative phase shift $\chi$ in the reflected reference beam 56 as a result of the two transits of reference beam 50 through phase shifter 64. The magnitude of phase shift X is controlled by control signal 132 from electronic controller, signal processor, and computer 200.

Figure 2C:
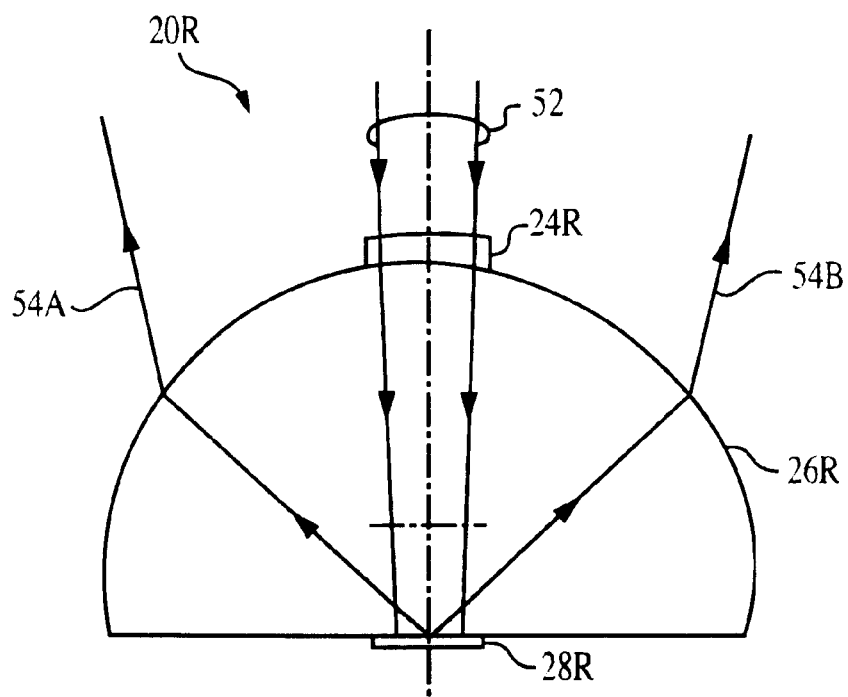
FIG. 2c illustrates, in schematic form, the reference object 20R comprising Amici type objective lens 26R and lens 24R, as used in the first embodiment.
Figure 2D:
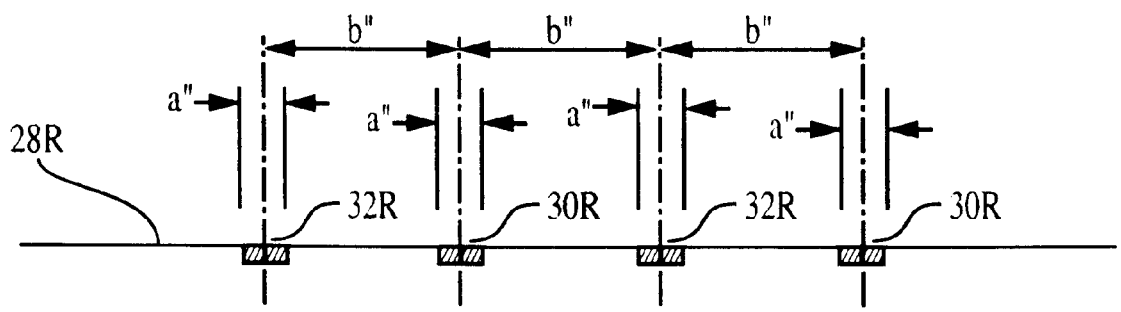
FIG. 2d illustrates, in schematic form, element 28 comprising reflecting elements 30R and 32R used in reference object 20R.

The propagation of reference beam 52 through reference object 20R is shown schematically in an expanded form in FIG. 2c. Reference object 20R is an Amici type objective lens. Reference beam 52 is focused by reference object 20R to a beam diameter at element 28R that encompasses an array of at least two wavelength or sub-wavelength reflecting spots on element 28R. Element 28R is shown schematically in FIG. 2d in an expanded form as an array of reflecting spots 30R and 32R on a surface of Amici type objective lens 26R. Reflecting spots 30R and 32R generate reflected reference beam components of beam 54 that correspond to elements 30 and 32, respectively, of element 28. The spacing of the reflective spots 30R and 32R and the focal length of lens 66 are chosen such that reflective spots 30R and 32R and elements 30 and 32, respectively, are conjugates as seen by a subsequent imaging onto a detector. The diameter a" of the reflective spots 30R and 32R is chosen to efficiently generate reflected reference beam 56 with a diameter substantially the same as the diameter of return beam 36. The relative reflectivities of reflecting spots 30R and 32R may be the same or beneficially different depending on an end use application.

It will be evident to those skilled in the art that the path of the reference beam could be configured such that the reference beam is transmitted by a reference object 20R having an element which is complimentary to element 28R of the first embodiment without departing from the spirit and the scope of the present invention. Examples of the generation of a reference beam by transmitting beams through wavelength and/or sub-wavelength apertures is described in cited U.S. Provisional Application by Hill entitled "Multiple-Source Arrays With Optical Transmission Enhanced By Resonant Cavities."

A portion of return beam 36 is transmitted by half-wave phase retardation plate 44 (see FIG. 1) and incident on beam splitter 100 wherein a portion thereof is reflected as a return beam component of phase shifted beam 38A. Phase-shifted beam 38A comprises rays between ray 38A and the corresponding optical axis. A second portion of return beam 36 is incident on beam-splitter 100 wherein a portion thereof is reflected as a return beam component of non-phase-shifted beam 38B. Non-phase-shifted beam 38B comprises rays between ray 38B and the corresponding optical axis.

A portion of reflected reference beam 56 is transmitted by half-wave phase retardation plate 44R (see FIG. 1) and incident on beam splitter 100 wherein a portion thereof is transmitted as a reflected reference beam component of phase-shifted beam 38A. A second portion of return beam 36 is incident on beam splitter 100 wherein a portion thereof is transmitted as a reflected reference beam component of non-phase-shifted beam 38B. Phase-shifted beam 38A and non-phase-shifted beam 38B are mixed with respect to polarization by polarizer 68, then incident on lens 62, and focused as mixed phase-shifted beam 40A and beam non-phase-shifted beam 40B. Phase-shifted beam 40A comprises rays between ray 40A and the corresponding optical axis and non-phase-shifted beam 40B comprises rays between rays 40B and the corresponding optical axis. Mixed beams 40A and 40B are focused onto a pinhole plane 114 such that a pinhole in image plane 114 is a conjugate image of either one of the sub-wavelength apertures 30 or one of sub-wavelength scattering points 32.

Figure 3:
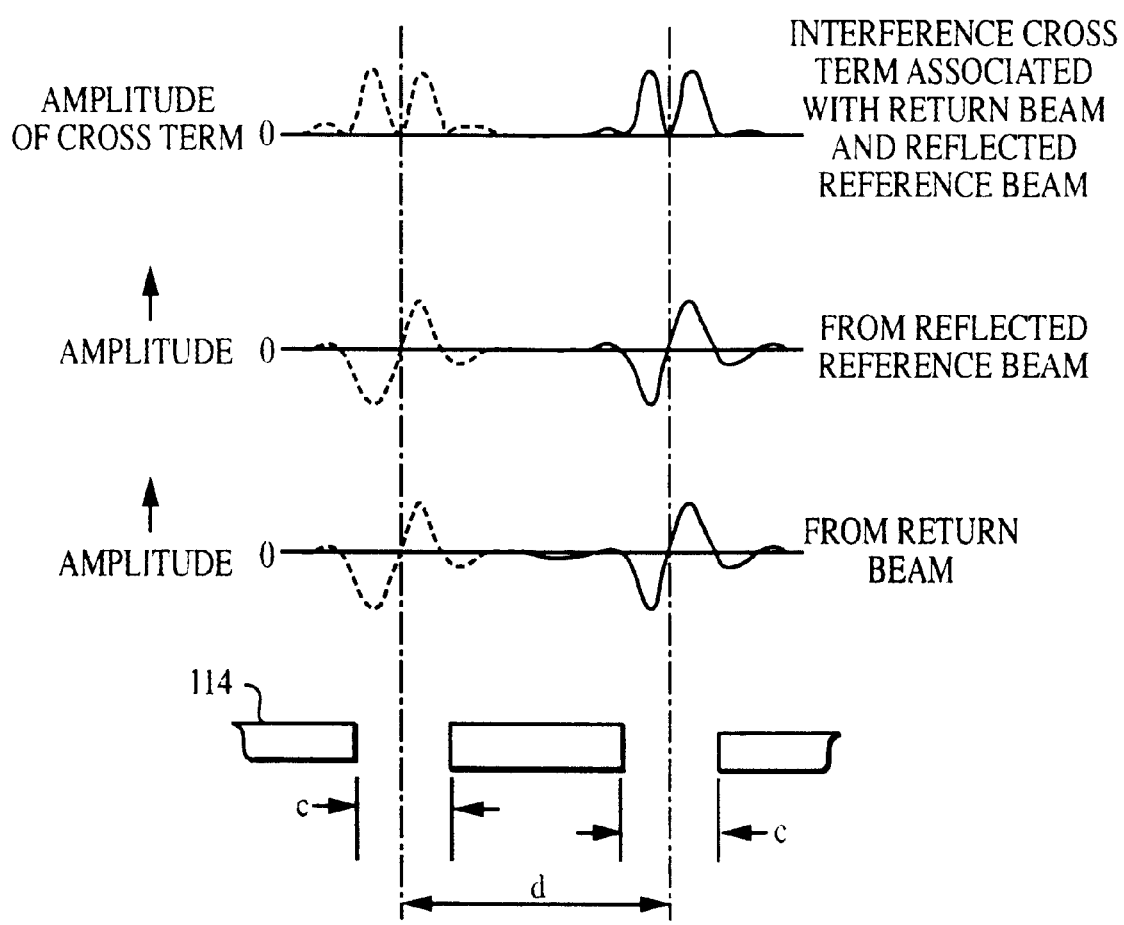
FIG. 3 illustrates, in schematic form, image plane 114 and amplitude distribution functions for images of a sub-wavelength aperture 30 and a sub-wavelength scattering site 32 at respective pinholes in image plane 114.

Pinhole plane 114 is shown schematically in FIG. 3. The diameter of the pinholes is c and the spacing between the pinholes is d. The spacing d is equal to the separation b of sub-wavelength apertures 30 and sub-wavelength scattering sites 32 times the magnification of the imaging system imaging the sub-wavelength apertures 30 and sub-wavelength scattering points 32 onto corresponding pinholes in pinhole plane 114. Diameter c is selected to be approximately twice the size of a diffraction limited image of a point object by the imaging system and the spacing d is selected to be larger than c, preferably $\geq$ to approximately four times the size of a diffraction limited image of a point object by the imaging system. Typical amplitude functions of diffraction limited images of wavelength or sub-wavelength apertures 30 and wavelength or sub-wavelength scattering sites 32 and corresponding to combined components of phase-shifted and non-phase-shifted beams 40A and 40B are shown in FIG. 3. Also shown in FIG. 3 are amplitude functions of diffraction limited images of wavelength or sub-wavelength apertures 30R and wavelength or sub-wavelength scattering sites 32R and corresponding to combined components of phase-shifted and non-phase-shifted beams 40A and 40B.

A portion of mixed beams 40A and 40B are transmitted by the pinholes in pinhole plane 114 and detected by a detector 116, preferably by a quantum photon detector. Detector 116 comprises an array of pixels, comprising either a pair of pixels, a one dimensional array of pixels, or a two dimensional array of pixels according to the requirements of an end-use application, with a one-to-one mapping of pinholes in pinhole plane 114 to the pixels of detector 116. Detector 116 generates an electrical interference signal comprising an array of signal values $[S_n]$ corresponding to the array of pixels. Subscript n is an index indicating an element in the array of signal values $[S_n]$. The array of signal values $[S_n]$ may comprise a pair of elements, a one-dimensional array comprising at least three elements, or a two-dimensional array depending on an end-use application.

The array of signal values $[S_n]$ may be written to a good approximation as $$[S_n] = [(S_D + S_I)_n] \tag{1}$$

where term $(S_D)_n$ represents terms either associated with sub-wavelength apertures 30 or associated with sub-wavelength apertures 32 and term $(S_I)_n$ represents interference cross terms either associated with sub-wavelength apertures 30 or associated with sub-wavelength apertures 32.

$A(S_D)_n$ term associated with sub-wavelength apertures 30 is proportional to the sum of the squares of the amplitudes of the corresponding portions of the near-field return probe beam, of the first background return beam, and of the reflected reference beam and interference cross terms between complex amplitudes of the near-field return probe beam and of the first background return beam. $A(S_D)_n$ term associated with sub-wavelength apertures 32 is proportional to the sum of the squares of the amplitudes of the corresponding portions of the second background return beam and of the reflected reference beam. $A(S_I)_n$ term associated with wavelength or sub-wavelength apertures 30 is proportional to the sum of the interference cross terms between complex amplitudes of the near-field return probe beam and of the reflected reference beam and between complex amplitudes of the first background return beam and of the reflected reference beam. $A$ $(S_I)_n$ term associated with sub-wavelength apertures 32 is proportional to the interference cross term between complex amplitudes of the second background return beam and of the reflected reference beam.

Term $(S_D)_n$ is independent of phase shift $\chi$. Term $(S_I)_n$ is a sinusoidal function of phase shift $\chi$ and may be written as $$(S_I)_n = (|S_I| \cos(\phi+\chi))_n \qquad (2)$$

where $(|S_I|)_n$ and $\phi$ are an amplitude and phase, respectively, related to the complex amplitudes contributing to $(S_I)_n$.

Operation of the apparatus of the first embodiment of the present invention depicted in FIGS. 1a, 4a, and 4b is based on the acquisition of a sequence of four measurements of arrays of signal values. The sequence of the four arrays of signal values $[S_n]_1$, $[S_n]_2$, $[S_n]_3$, and $[S_n]_4$ is obtained by detector 116 with phase shifter 64 introducing a sequence of phase shifts $\chi_0$, $\chi_0+\pi$, $\chi_0+\pi/2$, and $\chi_0+3\pi/2$ radians, respectively, where $\chi_0$ is some fixed value of phase shift $\chi$. The four arrays of signal values $[S_n]_1$, $[S_n]_2$, $[S_n]_3$, and $[S_n]_4$ are sent to electronic controller, signal processor, and computer 200 as signal 131, in either digital or analog format, for subsequent processing.

Conventional conversion circuitry, i.e., analog-to-digital converters, is included in either detector 116 or electronic controller, signal processor, and computer 200 for converting the four arrays $[S_n]_1$, $[S_n]_2$, $[S_n]_3$, and $[S_n]_4$ to a digital format. Phase shift $\chi$ introduced by phase shifter 64 is controlled by signal 132 where signal 132 is generated and subsequently transmitted by electronic controller, signal processor, and computer 200. Phase shifter 64 can be of an electro-optical type.

Next, two arrays of signal value differences $[S_n]_1$, $[S_n]_2 = [(S_I)_n]_1 - [(S_I)_n]_2$ and $[S_n]_3 - [S_n]_4 = [(S_I)_n]_3 - [(S_I)_n]_4$ are computed by electronic controller, signal processor, and computer 200.

Elements of the arrays of signal value differences corresponding to pixels that are associated with wavelength or sub-wavelength apertures 30 contain substantially and with relatively high efficiency only two interference cross terms, a first interference cross term between the complex amplitude of the near-field return probe beam and of the complex amplitude of the reflected reference beam and a second interference cross term between the complex amplitude of the first background return beam and of the complex amplitude of the reflected reference beam.

Elements of the arrays of signal value differences corresponding to pixels that are associated with wavelength or sub-wavelength scattering sites 32 contain substantially and with relatively high efficiency only the interference cross term between the complex amplitude of the second background return beam and of the complex amplitude of the reflected reference beam.

The relatively high efficiency for isolation of effects of amplitudes of beams associated with wavelength or sub-wavelength apertures 30 and wavelength or sub-wavelength scattering sites 32 in the measured intensity values is due in part to the properties of the amplitude functions shown in FIG. 3 and in part controlled by the choice of parameters c and d. The combined amplitude function of return beam components of phase-shifted beam 40A and non-phase-shifted beam 40B is an anti-symmetric function about the center line of a corresponding aperture. The combined amplitude function of reflected reference beam components of phase-shifted beam 40A and non-phase-shifted beam 40B is an anti-symmetric function about the center line of a corresponding aperture. Thus the interference cross term between the combined amplitude function of return beam components of phase-shifted beam 40A and non-phase-shifted beam 40B and the combined amplitude function of reflected reference beam components of phase-shifted beam 40A and non-phase-shifted beam 40B is a symmetric function about the center line of the corresponding aperture. The integral of a symmetric function across the corresponding aperture is non-zero and the interference cross term detected with high efficiency.

The complex amplitude of the near-field return probe beam is computed by electronic controller, signal processor, and computer 200 from the amplitude of the first interference term between the complex amplitude of the near-field return probe beam and the amplitude of the reflected reference beam. The computation comprises using measured values of the interference cross terms between components of the complex amplitude of the second background return beam and components of the complex amplitude of the reflected reference beam to compensate the measured values of elements of signal value differences associated with wavelength or sub-wavelength apertures 30 for the contribution of the second interference cross terms between components of the complex amplitude of the first background return beam and components of the complex amplitude of the reflected reference beam. The computation further comprises using measured values for the square of the amplitudes of the portions of the reflected reference beam transmitted by the pinholes of pinhole plane 114 and detected by detector 116.

Object material 112 is mounted on an object chuck 160. The angular orientation and height of object chuck 160 is controlled by three transducers, two of which are shown as 161A and 161B, that are attached to chuck stage 162. The angular orientation and height of object material 112 relative to the surface of conducting element 28 are detected and used to generate error signals. The detection and generation of error signals may be by known techniques in the art such as capacitive or "cap" gauges, precision distance measuring interferometry including wave domain reflectometry [see, e.g., commonly owned U.S. patent application with Ser. No. 09/089,105 and entitled "Methods And Apparatus For Confocal Interference Microscopy Using Wavenumber Domain Reflectometry And Backgroung Amplitude Reduction And Compensation" by Henry A. Hill, the contents of which is incorporated herein by reference] and scanning interferometric near-field microscopy [see, e.g., previously mentioned U.S. Patent Application entitled "Control of Position and Orientation of Sub-Wavelength Aperture Array in Near-field Scanning Microscopy;" by Henry A. Hill.] The error signals are transmitted as a component of signal 166 to electronic controller, signal processor, and computer 200. Servo control signals are generated by electronic controller, signal processor, and computer 200 from the error signals and transmitted as a servo control signal component of signal 166 to chuck stage 162. Transducers 161A, 161B, and the third transducer (not shown) alter the orientation and/or height of object material 112 according to the servo control signal component of signal 166.

The location of chuck stage 162 in a plane substantially parallel to the surface of element 28 is controlled by translator 164. The location of chuck stage 162 is detected by known techniques in the art such as precision distance measuring interferometry and error signals transmitted as an error signal component of signal 168 to electronic controller, signal processor, and computer 200. [See U.S. patent application with Ser. No. 09/252,266 entitled "Interferometer And Method For Measuring The Refractive Index And Optical Path Length Effects Air" by Peter de Groot, Henry A. Hill, and Frank C. Demarest filed Feb. 18, 1999 and U.S. patent application with Ser. No. 09/252,266 entitled "Apparatus And Method For Measuring The Refractive Index And Optical Path Length Effects Of Air Using Multiple-Pass Interferometry" by Henry A. Hill, Peter de Groot, and Frank C. Demarest filed Feb. 18, 1999. The contents of both applications are incorporated herein by reference.] Servo control signals are generated by electronic controller, signal processor, and computer 200 from the error signal component of signal 168 and transmitted as a servo signal component of signal 168 to translator 164. Translator 164 controls the location and orientation of chuck stage 162 in one or two orthogonal directions and in one or two orthogonal planes of orientation, according to the requirements of an end use application, in response to the servo signal component of signal 168.

Next, the object material 112 is scanned in a combination of one or two orthogonal directions substantially parallel to the surface of object material 112 and in the spatial separation of the element 28 from the adjacent surface of object material 112 according to the requirements of an end-use application. Measured arrays of signal values $[S_n]_1$, $[S_n]_2$, $[S_n]_3$, and $[S_n]_4$ are obtained as a function of the scanned parameters and the amplitudes and phases of the respective interference cross terms between the complex amplitude of the respective near field return probe beam and of the respective complex amplitude of the reflected reference beam computed by electronic controller, signal processor, and computer 200.

Information with apparatus of the first embodiment about object material 112 is acquired in the presence of a significantly reduced background signal. Sources of contributions to the background signal comprise the first background return beam, a portion of the return measurement beam not occulted by stop 70, a background produced by reflection and/or scattering of other beams associated with the measurement beam in the apparatus of the first embodiment, and corresponding beams associated with the reflected reference beam. The background signal is significantly reduced first because the apparatus of the first embodiment comprises a confocal optical imaging/detecting system, second because of effects of halfwave phase retardation plates 44 and 44R, and third because of the background compensation procedure based on measurement of the second background return beam.

It is well known to those in the art that confocal optical imaging/detecting systems have significantly improved depth discrimination in relation to non-confocal optical imaging/detecting systems and therefore significantly improved discrimination against scattered/reflected beams generated in plane sections displaced from the plane section being imaged. The effects of halfwave phase retardation plates 44 and 44R produces a further reduction of systematic effects and of statistical effects of background beams, However, confocal optical imaging/detecting systems and the effects of halfwave phase retardation plates 44 and 44R do not discriminate against the first background return beam. The background compensation procedure based on measurement of the second background return beam compensates for the first background return beam that is not discriminated against by the confocal imaging/detecting properties of the apparatus of the first embodiment. It should be noted that The background compensation procedure based on measurement of the second background return beam further compensates for the scattered/reflected beams generated in plane sections displaced from the plane section being imaged not discriminated against by the confocal imaging/detecting properties and the effects of halfwave phase retardation plates 44 and 44R of the apparatus of the first embodiment.

The effects of halfwave phase retardation plates 44 and 44R produces a further reduction of systematic effects and of statistical effects of background beams. The further reduction of the interference cross term between the reflected reference beam and a component of a background beam follows in part from the fact that the amplitude of a beam decreases as the distance to the image plane is increased. This property is the basis of the reduced background in prior-art confocal interference microscopy. However, in the apparatus of the present invention, the reduction in magnitude of the interference cross term between an out-of-focus scattered beam and the combined reflected reference beam components of phase-shifted beam 40A and non-phase-shifted beam 40B is enhanced in relation to that achieved in prior-art confocal interference microscopy.

The enhanced reduction referred to in the preceding paragraph is realized by the presence of phase shifters 44 and 44R. The part of the out-of-focus scattered beam that interferes with the complex in-focus combined reflected reference beam components of phase-shifted beam 40A and non-phase-shifted beam 40B generally displays only small relative changes across the space of the in-focus combined reflected reference beam components of phase-shifted beam 40A and non-phase-shifted beam 40B. Thus the spatial distribution of the interference cross term between the out-of-focus scattered beam and the in-focus combined reflected reference beam components of phase-shifted beam 40A and non-phase-shifted beam 40B is comprised primarily of a antisymmetric distribution about the center line of a corresponding aperture in aperture array 114. The integral of a antisymmetric distribution about an interval centered on the center line of the corresponding aperture is zero. Thus the net contribution of the interference cross term between the complex amplitude of an out-of-focus scattered beam and the reflected reference beam comprising a phase shifted and a non-phase shifted components is significantly reduced beyond that achieved in prior-art confocal interference microscopy.

The scanning of object material 112 in a combination of one or two orthogonal directions substantially parallel to the surface of object material 112 and in the spatial separation of the element 28 from the adjacent surface of object material 112 is implemented for the first embodiment as a "step and repeat" mode.

Other forms of the techniques for reduction of effects of background beams in confocal microscopy systems as described in commonly owned U.S. patent application Ser. No. 5,760,901 issued Jun. 2, 1998 and entitled "Method And Apparatus For Confocal Interference Microscopy With Background Amplitude Reduction And Compensation" by Henry A. Hill may be incorporated into the apparatus of FIG. 1 without departing from the spirit and scope of the present invention. The contents the cited U.S. Patent are herein incorporated by reference.

Further embodiments of the invention include adapting the systems described above to operate in a transmission mode. Once such embodiment is shown in FIG. 4.

Figure 4:
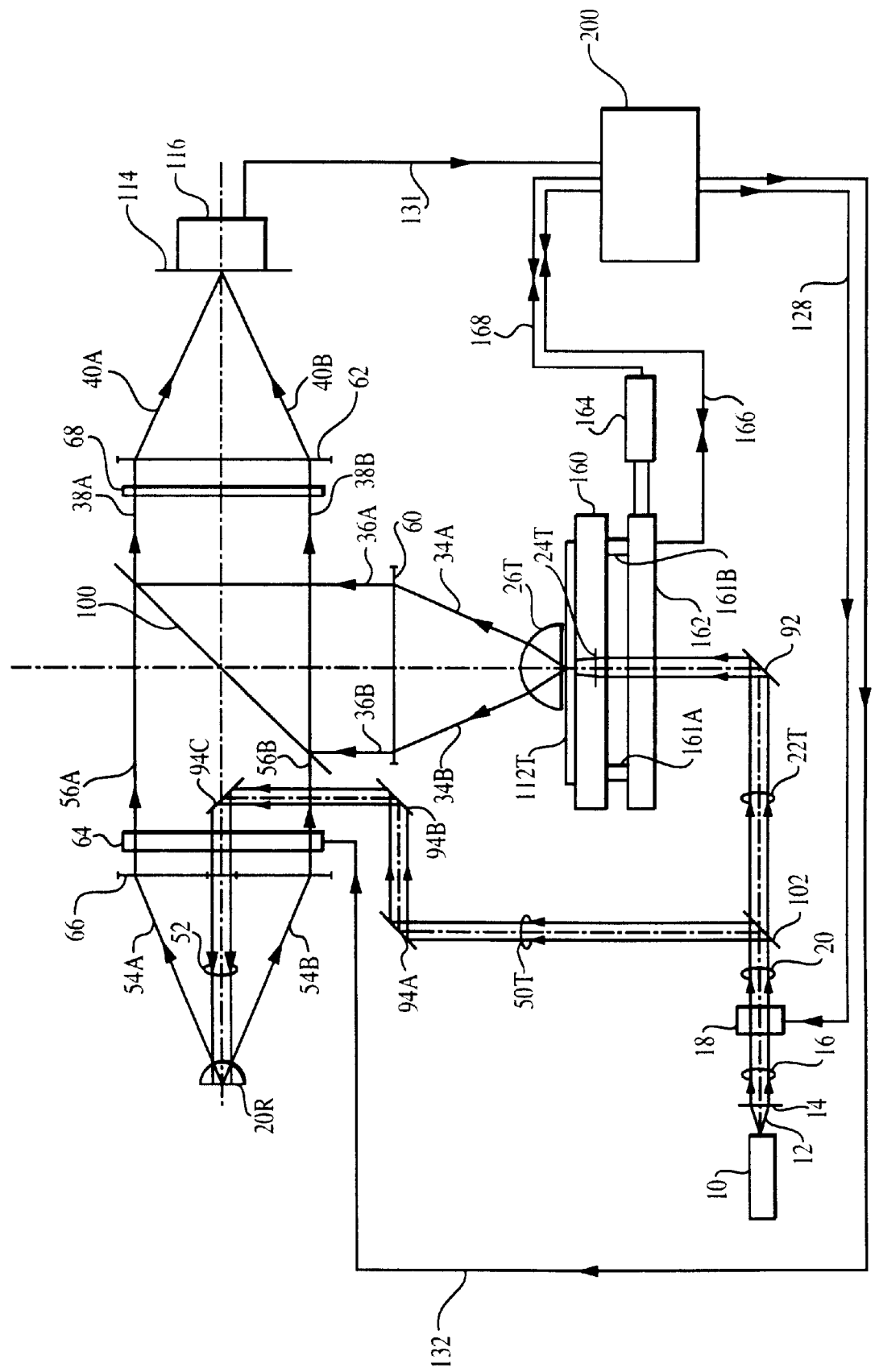
FIG. 4 illustrates, in schematic form, an embodiment of the invention operating in a transmission mode.

Many elements of the embodiment shown in FIG. 4 perform similar functions as elements of the earlier embodiment and are indicated in FIG. 4 with the same element numbers as corresponding elements of the first embodiment shown in FIG. 1.

Beam 20 is incident on non-polarizing beam splitter 102, and a first portion thereof is transmitted as measurement beam 22T. Measurement beam 22T is next reflected by mirror 92 and then focused to a spot on substrate 112T after reflection by mirror 90. Substrate 112T comprises a transparent substrate at the wavelength of beam 20 and an array of wavelength and/or sub-wavelength apertures corresponding to apertures 30 of the first embodiment. A portion of measurement beam 22T focused to the spot is transmitted by the sub-wavelength apertures 30 as an array of near-field probe beams. The description of the sub-wavelength apertures 30 is the same as the corresponding portion of the description given for the array of sub-wavelength apertures 30 of the first embodiment. The diameter of the spot is large enough span the array of sub-wavelength apertures 30.

Sample 25 to be examined by the array of near-field beams is placed on the flat surface of Amici type lens 26T. The array of near-field probe beams is transmitted by sample 25 as a transmitted beam 34 corresponding to beam 34 of the first embodiment with respect to subsequent processing by the apparatus of the fifth embodiment.

A second portion of beam 20 is reflected by mirror 102 as reference beam 50T, as shown in FIG. 4. Reference beam 50T is transmitted through an aperture in lens 60 as reference beam 52 after reflection by mirrors 94A, 94B, and 94C. The description of reference beam 52 is the same as corresponding portions of the description given for beam 52 of the first embodiment.

In additional embodiments, the function of the phase retardation plates may be more generally imparted by the use of a phase mask, which may extend over some or all of the respective beam. Such a phase mask may impart a the same or different phase shifts to selected transverse regions of an incident beam. For example, to causes the conjugate image for each reference element and each measurement aperture to have an asymmetric profile along at least a first dimension, the phase masks in the return reference and measurement beams may impart a pi phase-shift to half of the respective beam. This may be accomplished by, e.g., bisecting the beam with the pi phase-shift, or, e.g., by impart the pi phase-shift to different regions of the respective beam comprising half its transverse area in the pupil plane. One such example for the latter case would be a periodic alternating pattern of pi phase-shifts. Such variable patterns may further extend along multiple transverse dimensions. Moreover, in some embodiments the phase mask may be a composite phase mask formed by a series of individual phase masks.

Furthermore, in additional embodiments, rather than placing a separate phase mask in the each of the return measurement and reference beams, one phase mask may be positioned in a pupil plane of the imaging system where the return measurement and reference beams are combined as a mixed beam.

Other aspects, advantages, and modifications are within the scope of the following claims.

What is claimed is:

1. An interferometric optical microscopy system for imaging an object, the system comprising:

a beam splitter positioned to separate an input beam into a measurement beam and a reference beam;

a measurement beam source array positioned to receive the measurement beam, the measurement beam source array comprising a mask having an array of measurement apertures each configured to radiate a portion of the measurement beam to the object, the object interacting with the radiated measurement beam portions to direct signal radiation back through the apertures to define a measurement return beam;

a reference beam source array positioned to receive the reference beam, the reference beam source array comprising an array of elements each configured to radiate a portion of the reference beam, the radiated reference beam portions defining a reference return beam;

a multi-element photo-detector;

imaging optics positioned to direct the measurement and reference return beams to the photo-detector and configured to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object; and at least one phase mask positioned to contact the return measurement beam and the return reference beam, wherein the at least one phase mask causes the conjugate image for each reference element and each measurement aperture to have an asymmetric profile along at least a first dimension.

2. The system of claim 1, wherein the at least one phase mask comprises a first phase mask and a second phase mask, wherein the first phase mask is positioned to contact the return measurement beam and not the return reference beam, and wherein the second phase mask is positioned to contact the return reference beam and not the return measurement beam.

3. The system of claim 1, wherein the at least one phase mask comprises a first phase mask positioned to contact both of the return measurement beam and the return reference beam.

4. The system of claim 1, wherein the at least one phase mask divides the transverse profile of the return measurement beam and the return reference beam into multiple sections along the first dimension and imparts a relative phase shift equal to $\pi+2\pi n$, where is n is an integer, to half of the multiple sections.

5. The system of claim 1, wherein the phase mask further causes the conjugate image for each reference element and each measurement aperture to have an asymmetric profile along a second dimension orthogonal to the first dimension.

6. The system of claim 5, wherein the at least one phase mask divides the transverse profile of the return measurement beam and the return reference beam along the first dimension into multiple sections and imparts a relative phase shift equal to $\pi+2\pi n_1$, where is $n_1$ is an integer, to half of the multiple sections corresponding to the first dimension, and wherein the at least one phase mask further divides the transverse profile of the return measurement beam and the return reference beam along a second dimension orthogonal to the first dimension into multiple sections and imparts a relative phase shift equal to $\pi+2\pi n_2$, where is $n_2$ is an integer, to half of the multiple sections corresponding to the second dimension.

7. The system of claim 1, further comprising a second, at least one phase mask positioned to contact the return measurement beam and the return reference beams, wherein the second, at least one phase mask causes the conjugate image for each reference element and each measurement aperture to have an asymmetric profile along a second dimension orthogonal to the first dimension.

8. The system of claim 2, wherein the first phase mask is positioned in a pupil plane of the imaging optics for the return measurement beam and the second phase mask is positioned in a pupil plane of the imaging optics for the return reference beam.

9. The system of claim 3, wherein the first phase mask is positioned in a pupil plane of the imaging optics for the return measurement beam and the return reference beam.

10. The system of claim 1, further comprising a pinhole array positioned adjacent the photo-detector, wherein each pinhole is aligned with a separate set of one or more detector elements, and wherein the imaging system causes the conjugate image for each measurement aperture to align with a corresponding pinhole of the pinhole array.

11. The system of claim 1,
wherein the mask in the measurement beam source array further comprises an array of measurement scattering elements, wherein each measurement scattering element is adjacent a corresponding one of the measurement apertures and has transverse dimensions comparable to the corresponding measurement aperture, and wherein each measurement scattering element scatters a portion of the measurement beam, the measurement return beam further comprising the portions of the measurement beam scattered by the measurement scattering elements, and wherein the imaging optics are further configured to produce a conjugate image of the array of measurement scattering elements that overlaps with the conjugate image of the array of reference elements, wherein the conjugate image for each measurement scattering element overlaps with the conjugate image of a corresponding reference element to produce an optical interference signal that provides an estimate of scattering from the adjacent measurement aperture.

12. The system of claim 11, further comprising a pinhole array positioned adjacent the photo-detector, wherein each pinhole is aligned with a separate set of one or more detector elements, and wherein the imaging system causes the conjugate image for each measurement aperture and each measurement scattering element to align with a corresponding pinhole of the pinhole array.

13. The system of claim 1, wherein each reference element comprises a reflective element.

14. The system of claim 1, wherein each reference element comprises a transmissive aperture.

15. An interferometric optical microscopy system for imaging an object, the system comprising:
a beam splitter positioned to separate an input beam into a measurement beam and a reference beam;
a measurement beam source array positioned to receive the measurement beam, the measurement beam source array comprising a mask having an array of source apertures each configured to radiate a portion of the measurement beam to the object;
a measurement beam detector array comprising a mask having an array of measurement apertures, wherein the object interacts with the radiated measurement beam portions and directs the resulting signal radiation through the measurement apertures to define a measurement return beam;
a reference beam source array positioned to receive the reference beam, the reference beam source array comprising an array of elements each configured to radiate a portion of the reference beam, the radiated reference beam portions defining a reference return beam;
a multi-element photo-detector;
imaging optics positioned to direct the measurement and reference return beams to the photo-detector and configured to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object; and
at least one phase mask positioned to contact the return measurement beam and the return reference beams, wherein the at least one phase mask causes the conjugate image for each reference element and each measurement aperture to have an asymmetric profile along at least a first dimension.

16. The system of claim 15, wherein the at least one phase mask comprises a first phase mask and a second phase mask, wherein the first phase mask is positioned to contact the return measurement beam and not the return reference beam, and wherein the second phase mask is positioned to contact the return reference beam and not the return measurement beam.

17. The system of claim 15, wherein the at least one phase mask comprises a first phase mask positioned to contact both of the return measurement beam and the return reference beam.

18. The system of claim 15, wherein the at least one phase mask divides the transverse profile of the return measurement beam and the return reference beam into multiple sections along the first dimension and imparts a relative phase shift equal to $\pi+2\pi n$, where is n is an integer, to half of the multiple sections.

19. The system of claim 15, wherein the phase mask further causes the conjugate image for each reference element and each measurement aperture to have an asymmetric profile along a second dimension orthogonal to the first dimension.

20. The system of claim 19, wherein the at least one phase mask divides the transverse profile of the return measurement beam and the return reference beam along the first dimension into multiple sections and imparts a relative phase shift equal to $\pi+2\pi n_1$, where is $n_1$ is an integer, to half of the multiple sections corresponding to the first dimension, and wherein the at least one phase mask further divides the transverse profile of the return measurement beam and the return reference beam along a second dimension orthogonal to the first dimension into multiple sections and imparts a relative phase shift equal to $\pi+2\pi n_2$, where is $n_2$ is an integer, to half of the multiple sections corresponding to the second dimension.

21. The system of claim 15, further comprising a second, at least one phase mask positioned to contact the return measurement beam and the return reference beam, wherein the second, at least one phase mask has a phase mask pattern that causes the conjugate image for each reference element and each measurement aperture to have an asymmetric profile along a second dimension orthogonal to the first dimension.

22. The system of claim 16, wherein the first phase mask is positioned in a pupil plane of the imaging optics for the return measurement beam and the second phase mask is positioned in a pupil plane of the imaging optics for the return reference beam.

23. The system of claim 17, wherein the first phase mask is positioned in a pupil plane of the imaging optics for the return measurement beam and the return reference beam.

24. The system of claim 15, further comprising a pinhole array positioned adjacent the photo-detector, wherein each pinhole is aligned with a separate set of one or more detector elements, and wherein the imaging system causes the conjugate image for each measurement aperture to align with a corresponding pinhole of the pinhole array.

25. The system of claim 15, wherein each reference element comprises a reflective element.

26. The system of claim 15, wherein each reference element comprises a transmissive aperture.

27. An interferometric, microscopy method for imaging an object, the method comprising:

separating an input beam into a measurement beam and a reference beam;

directing the measurement beam to an array of measurement apertures to cause a portion of the measurement beam to couple through each of the measurement apertures and radiate the object;

receiving signal radiation from the object back through the apertures in response to the radiated measurement beam portions, wherein the signal radiation defines a measurement return beam;

directing the reference beam to an array of reference elements each configured to radiate a portion of the reference beam, the radiated reference beam portions defining a reference return beam;

imaging the measurement and reference return beams onto a photo-detector to produce overlapping conjugate images of the array of reference elements and the array of measurement apertures on a photo-detector, wherein the conjugate image for each measurement aperture overlaps with the conjugate image of a corresponding reference element to produce an optical interference signal indicative of a particular region of the object; and imparting a phase pattern onto each of the return measurement beam and the return reference beam that causes the conjugate image for each reference element and each measurement aperture to have an asymmetric profile along at least a first dimension.

28. An interferometric, microscopy method for imaging an object, the method comprising:

separating an input beam into a measurement beam and a reference beam;

directing the measurement beam to an array of source apertures to cause a portion of the measurement beam to couple through each of the measurement apertures and radiate the object;

receiving signal radiation from the object through an array of measurement apertures in response to the radiated measurement beam portions, wherein the signal radiation defines a measurement return beam;

directing the reference beam to an array of reference elements each configured to radiate a portion of the reference beam, the radiated reference beam portions defining a reference return beam;

imaging the measurement and reference return beams onto a photo-detector to produce overlapping conjugate images of the array of reference elements and the array of measurement apertures on a photo-detector, wherein the conjugate image for each measurement aperture overlaps with the conjugate image of a corresponding reference element to produce an optical interference signal indicative of a particular region of the object; and imparting a phase pattern onto each of the return measurement beam and the return reference beam that causes the conjugate image for each reference element and each measurement aperture to have an asymmetric profile along at least a first dimension.

* * * * *

UNITED STATES PATENT AND TRADEMARK OFFICE
CERTIFICATE OF CORRECTION

PATENT NO. : 6,667,809 B2
DATED : December 23, 2003
INVENTOR(S) : Henry A. Hill

It is certified that error appears in the above-identified patent and that said Letters Patent is hereby corrected as shown below:

Columnn 2,
Line 38, delete "is" before "n"
Line 46, delete "is" before "$n_1$"
Line 52, delete "is" before "$n_2$"

Column 4,
Line 19, delete "is" before "n"
Line 27, delete "is" before "$n_1$"
Line 33, delete "is" before "$n_2$"

Column 10,
Line 7, replace "an" with -- a --

Column 11,
Lines 62 and 67, replace "<<" with -- « --
Line 64, replace ">>" with -- » --

Column 13,
Line 24, replace "X" with -- $\chi$ --

Column 15,
Lines 28 and 29, replace "ϕ" with -- φ --

Column 18,
Line 15, replace "The" with -- the --
Lines 50 and 52, replace "a" with -- an --

Column 19,
Line 7, after "contents" insert -- of --
Line 11, after "mode" replace "Once" with -- One --
Line 31, after "enough" insert -- to --
Line 48, delete "a" after "import"
Line 50, replace "causes" with -- cause --

Column 20,
Line 56, delete "is" before "n"
Line 66, delete "is" before "$n_1$"

Column 21,
Line 5, delete "is" before "$n_2$"

UNITED STATES PATENT AND TRADEMARK OFFICE
CERTIFICATE OF CORRECTION

PATENT NO.    : 6,667,809 B2
DATED         : December 23, 2003
INVENTOR(S)   : Henry A. Hill It is certified that error appears in the above-identified patent and that said Letters Patent is hereby corrected as shown below:

Column 22,
Line 46, delete "is" before "n"
Line 57, delete "is" before "$n_1$"
Line 63, delete "is" before "$n_2$"

Signed and Sealed this

Third Day of August, 2004

JON W. DUDAS
*Acting Director of the United States Patent and Trademark Office*